(12) United States Patent
Mukai

(10) Patent No.: US 7,643,565 B2
(45) Date of Patent: Jan. 5, 2010

(54) PORTABLE TERMINAL, COMMUNICATION SYSTEM, AND COMMUNICATION METHOD

(75) Inventor: Manabu Mukai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 853 days.

(21) Appl. No.: 10/919,399

(22) Filed: Aug. 17, 2004

(65) Prior Publication Data

US 2005/0073971 A1 Apr. 7, 2005

(30) Foreign Application Priority Data

Sep. 30, 2003 (JP) .................... 2003-342212

(51) Int. Cl.
*H04K 1/10* (2006.01)
(52) U.S. Cl. .................. 375/260; 375/348; 375/346; 455/436; 455/437; 455/442
(58) Field of Classification Search ................ 375/260, 375/264, 278, 324, 325, 343, 347, 348, 142, 375/143, 149, 150; 370/208, 331; 455/436, 455/437, 442
See application file for complete search history.

(56) References Cited

U.S. PATENT DOCUMENTS 6,714,511 B1 * 3/2004 Sudo et al. .................. 370/208

7,324,434 B2 * 1/2008 Sawahashi et al. .......... 370/208
2003/0026235 A1 * 2/2003 Vayanos et al. ............. 370/342

FOREIGN PATENT DOCUMENTS

| JP | 11-308195 | 11/1999 |
|---|---|---|
| JP | 2002-247005 | 8/2002 |
| JP | 2002-374223 | 12/2002 |
| JP | 2003-23410 | 1/2003 |

* cited by examiner

*Primary Examiner*—Shuwang Liu
*Assistant Examiner*—Rahel Guarino
(74) *Attorney, Agent, or Firm*—Oblon, Spivak, McClelland, Maier & Neustadt, L.L.P.

(57) ABSTRACT

A portable terminal communicates with a plurality of base stations by use of an OFDM signal. The portable terminal includes a communication unit sending and receiving the OFDM signal to and from the base stations, a switching timing detector, and an OFDM signal controller. The switching timing detector detects switching timing at which handover and a normal state are switched therebetween. The OFDM signal controller changes a guard time length of the OFDM signal upon detecting the timing by the switching timing detector.

9 Claims, 18 Drawing Sheets

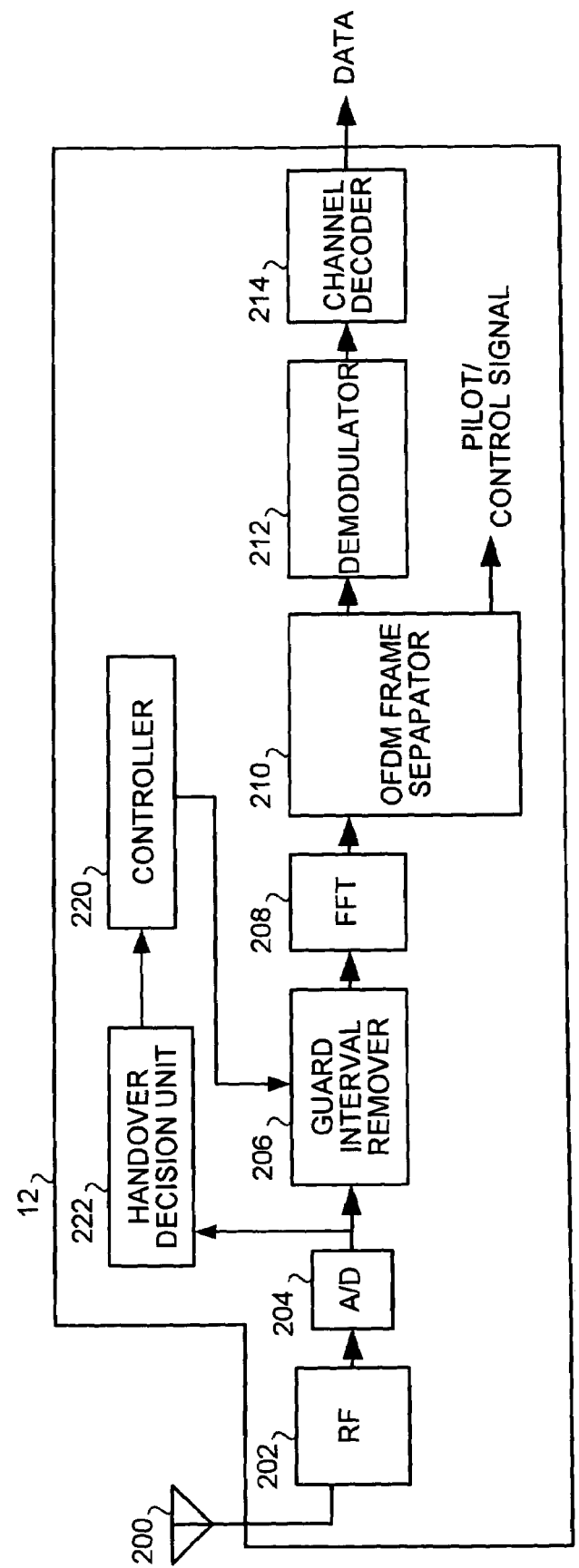

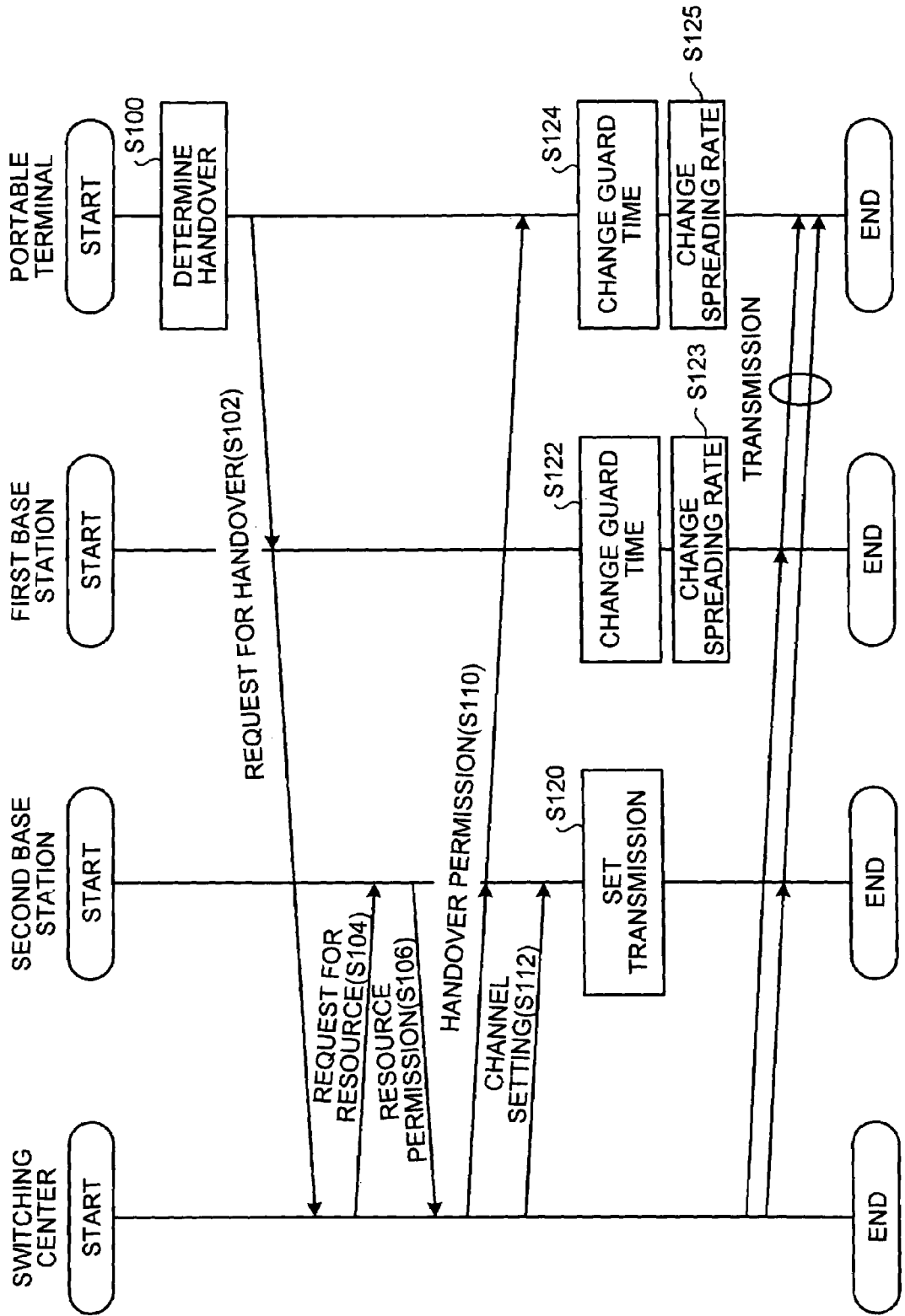

PORTABLE TERMINAL, COMMUNICATION SYSTEM, AND COMMUNICATION METHOD

CROSS-REFERENCE TO RELATED APPLICATIONS

This application is based upon and claims the benefit of priority from the prior Japanese Patent Application No. 2003-342212 filed on Sep. 30, 2003 the entire contents of which are incorporated herein by reference.

BACKGROUND OF THE INVENTION

1) Field of the Invention

The present invention relates to a portable terminal that communicates with base stations by use of an orthogonal frequency division multiplexing (OFDM) signal, a communication system including the portable terminal, and a communication method.

2) Description of the Related Art

In a conventional OFDM communication system, the OFDM signal includes a guard time of a predetermined length to suppress the deterioration of the OFDM signal that is caused by the influence of delayed waves. It is also known in the conventional art to determine the length of the guard time based on the delay time by a multipath propagation (For example, see Japanese Patent Application Laid-open No. 2002-374223).

In the OFDM communication between a portable terminal and a base station, a handover occurs as the portable terminal moves. It is known that OFDM signals sent from two base stations become degraded due to a difference in timing between the OFDM signals, during handover.

In the conventional OFDM signal communication system, however, no countermeasure has been developed or introduced against transient deterioration of the OFDM signals during handover. There is another problem of the conventional art that changing the length of the guard time with a change in the propagation environment requires stringent specifications for synchronization of timing for sending signals to the base station. Further, a communication system involving a spread spectrum modulation has a problem that channel throughput decreases when the length of the guard time is changed.

SUMMARY OF THE INVENTION

It is an object of the present invention to at least solve the problems in the conventional technology.

A portable terminal according to one aspect of the present invention communicates with a plurality of base stations by use of an OFDM signal, and includes a communication unit sending and receiving the OFDM signal to and from the base stations; a switching timing detector detecting switching timing at which handover and a normal state are switched therebetween; and an OFDM signal controller changing a guard time length of the OFDM signal upon detecting the timing by the switching timing detector.

A communication system according to another aspect of the present invention includes a plurality of base stations and a portable terminal which communicate with each other by use of an OFDM signal. The portable terminal includes a communication unit sending and receiving the OFDM signal to and from the base stations; a switching timing detector detecting switching timing at which handover and a normal state are switched therebetween; and an OFDM signal controller changing a guard time length of the OFDM signal upon detecting the switching timing by the switching timing detector. The base stations each change, at the same time as the OFDM signal controller changes the guard time length, the guard time length to the same length as that changed by the OFDM signal controller.

A method of communicating with a base station by use of an OFDM signal, according to still another aspect of the present invention, includes sending and receiving the OFDM signal to and from the base station; detecting switching timing at which handover and a normal state are switched therebetween; and changing a guard time length of the OFDM signal when the switching timing is detected.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 depicts the configuration of a receiver of the portable terminal, which performs receiving processing;

FIG. 16 is a flowchart of the procedure by which the communication system according to the fifth embodiment enters handover;

DETAILED DESCRIPTION

Figure 1:
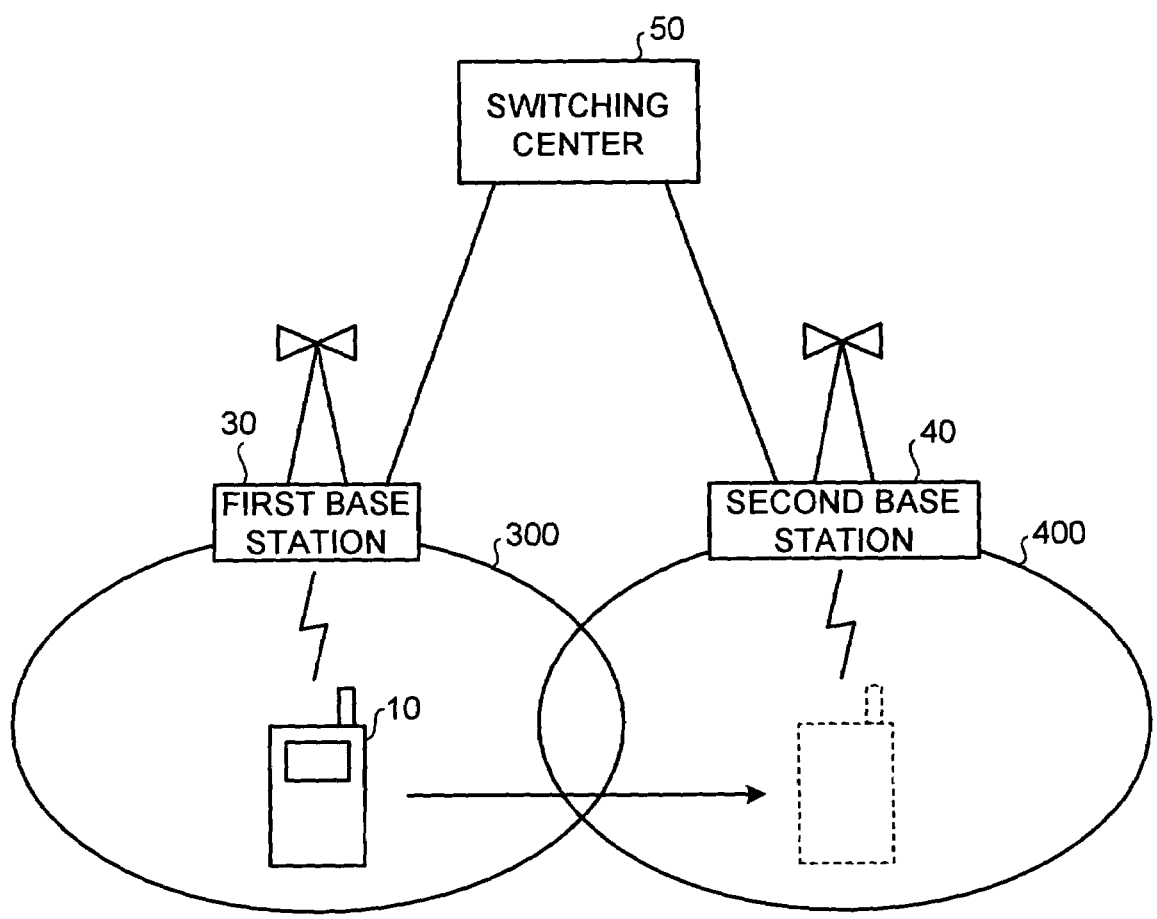
FIG. 1 is a general configuration of a communication system that includes a portable terminal according to a first embodiment of the present invention.

FIG. 1 is a general configuration of a communication system 1 that includes a portable terminal 10 according to a first embodiment of the present invention. The communication system 1 includes the portable terminal 10, a first base station 30, a second base station 40, and a switching center 50. The depicted system is intended as a cellular mobile telephone system in which plural base stations geographically establish their coverage. The portable terminals 10 and each base station of this system communicate with each other by an OFDM-based modulation scheme. As the portable terminal 10 moves, it communicates with the first base station 30 or the second base station 40. The switching center 50 controls the handover.

While this embodiment will be described in connection with the handover of the portable terminal 10 from the first base station 30 to the second station 40, the number of base stations capable of handover is not limited specifically to two.

Figure 2:
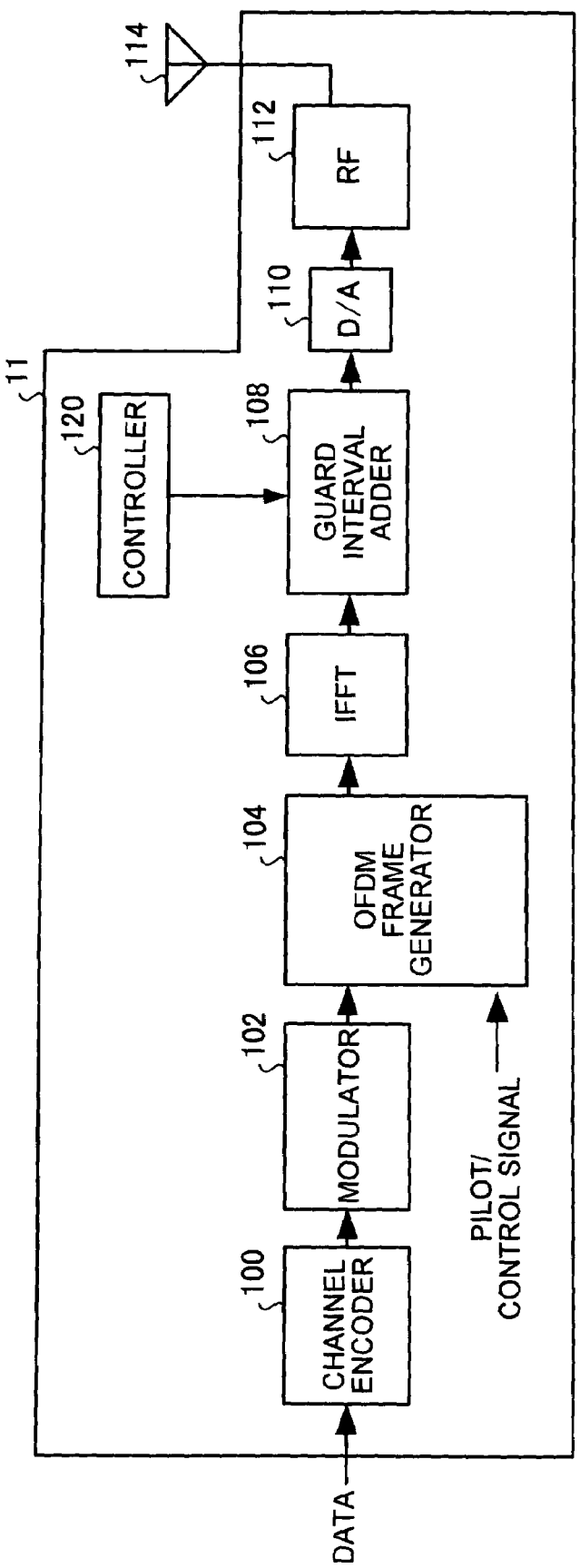
FIG. 2 depicts the configuration of a transmitter of the portable terminal according to the first embodiment.

FIG. 2 depicts the configuration of a transmitter 11 of the portable terminal 10 according to this embodiment. The transmitter 11 includes a channel encoder 100, a modulator 102, an OFDM frame generator 104, an inverse fast Fourier transform (IFFT) unit 106, a guard interval adder 108, a D/A converter 110, a radio frequency (RF) modulator 112, an antenna 114, and a controller 120.

The channel encoder 100 encodes data to be sent to the base station. The modulator 102 OFDM-modulates the encoded data. The OFDM frame generator 104 generates an OFDM frame including a plurality of OFDM symbols.

The IFFT unit 106 performs inverse fast Fourier transform of the OFDM frame generated by the OFDM frame generator 104. The guard interval adder 108 adds a guard interval to the information subjected to the inverse fast Fourier transform of the IFFT unit 106.

The controller 120 controls the guard interval adder 108. Specifically, the controller 120 controls the guard interval adder 108 to change the length of the guard time, depending on whether the portable terminal enters the handover. More specifically, different lengths of the guard time are predetermined for handover and for a normal state; the guard time is switched accordingly. The controller 120 in this embodiment corresponds to the OFDM signal controller described in the appended claims.

The OFDM signal is converted by the D/A converter 110 to an analog signal, which is modulated by the RF modulator 112, thereafter being sent via the antenna 114.

FIG. 3 depicts the configuration of a receiver of the portable terminal 10. The receiver 12 includes an antenna 200, an RF unit 202, an A/D converter 204, a guard interval remover 206, a fast Fourier transform (FFT) unit 208, an OFDM frame separator 210, a demodulator 212, a channel decoder 214, a controller 220, and a handover decision unit 222.

The antenna 200 receives the OFDM signal. The OFDM signal is down-converted by the RF unit 202 and converted by the A/D converter 204 to a digital signal, which is fed to the guard interval remover 206. The guard interval remover 206 removes the guard interval from the OFDM signal. The controller 220 controls the guard interval remover 206. More specifically, the controller 220 changes the guard interval to be removed, depending on whether the portable terminal 10 is in the handover operation. The guard interval remover 206 corresponds to the OFDM signal controller described in the appended claims. The handover decision unit 222 regularly monitors or observes the propagation environment; concretely, it measures the intensity of waves sent from respective base stations.

The FFT unit 208 performs fast Fourier transform of the information having removed therefrom the guard interval. The OFDM frame separator 210 separates one OFDM symbol data from the received information. The demodulator 212 performs OFDM demodulation of the data received from the OFDM frame separator 210. The channel decoder 214 decodes the demodulated data.

Figure 4A:
FIGS. 4A and 4B are schematic diagrams of an OFDM symbol.
Figure 4B:
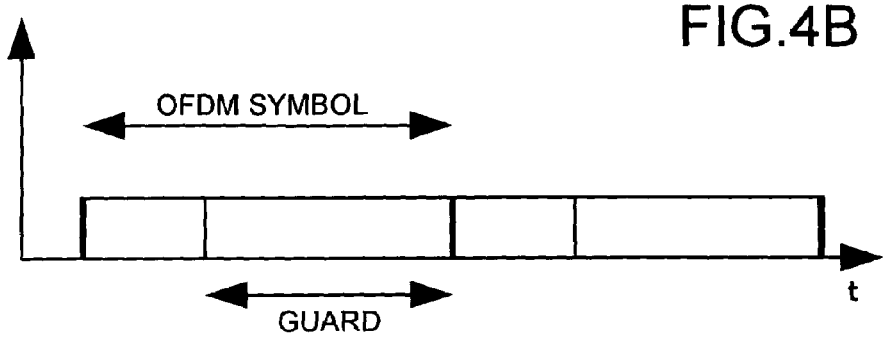

FIGS. 4A and 4B schematically depict the OFDM symbols that are sent and received between the portable terminal 10 and the base stations 30 and 40. In the communication system 1 according to this embodiment, OFDM symbols of different lengths are set for handover and for a normal state, respectively.

FIG. 4A depicts the OFDM symbol sent and received during the normal state. The length of the guard time in the symbol is set at an expected multipath propagation delay. FIG. 4B depicts the OFDM symbol sent and received during handover. As shown in FIG. 4B, the OFDM symbol sent and received during handover has a guard time longer than that of the OFDM symbol sent and received during the normal state. By increasing the length of the guard time, it is possible to provide for enhanced tolerance to the receiving timing difference between the first and the second base stations 30 and 40.

In this embodiment, the length of the OFDM symbol sent and received during handover is twice longer than that of the OFDM symbol sent and received during the normal state. The length of the data in the OFDM symbol is fixed irrespective of whether the portable terminal 10 is engaged in soft handover. The OFDM symbol during handover is longer than the OFDM symbol during a normal state by the difference in the length of guard time between them.

In this embodiment, although during handover the length of the OFDM symbol is twice longer than that during the normal state, it may also be set at an integral multiple, such as four or eight times.

Figure 5:
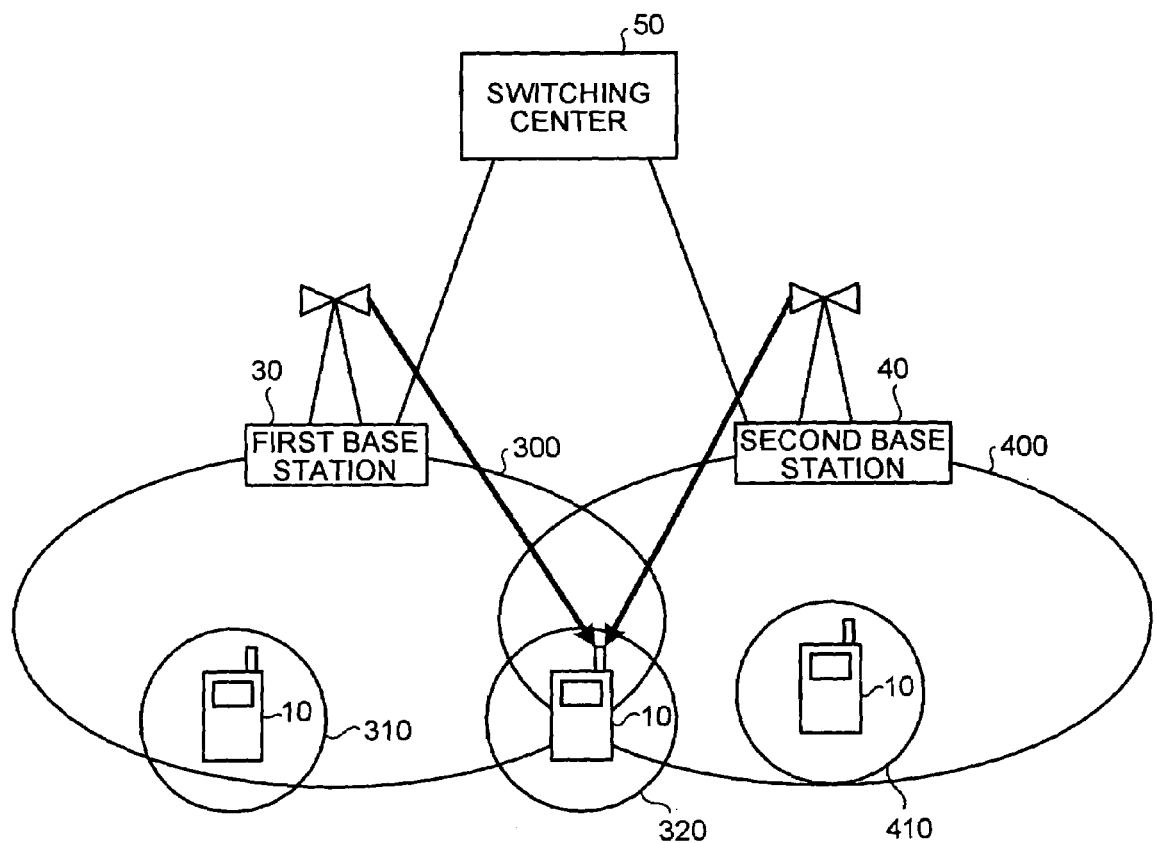
FIG. 5 schematically depicts how to carry out soft handover in an OFDM communication system according to the first embodiment.

FIG. 5 schematically depicts how to carry out soft handover in the OFDM communication system 1 according to this embodiment. In the communication system 1, the portable terminal and each base station communicate with each other by use of the OFDM-based modulation scheme. The depicted system is a cellular mobile telephone system in which plural base stations geographically establish their coverage areas.

In FIG. 5 the first base station 30 communicates with a communication device in a first region 300, and the second base station communicates with a communication device in a second region 400.

A description will be given of the handover that is performed when the portable terminal 10 moves from a position 310 in the first region 300 to a position 410 in the second region 400.

When the portable terminal 10 is at the position 310, the distance between the portable terminal 10 and the first base station is short, and hence sufficient radio communication quality can be held. When the portable terminal moves to a position 320 near the boundary between the first and the second regions, the mean communication quality is lower than that when the portable terminal 10 is at the position 310. At this time, the portable terminal 10 receives radio waves from the second station 40 with high intensity.

The OFDM signal has the property that radio waves, if including the same information, can be operated at the same frequency (Single Frequency Network: SFN). Accordingly, even when the portable terminal 10 is at the position 320, it is possible to increase the received signal power by receiving radio waves from both of the first and the second base stations 30 and 40. This configuration permits implementation of soft handover.

When the difference in the timing at which the portable terminal 10 receives radio waves from the both base stations exceeds the guard time of the OFDM symbol, inter-symbol interference occurs, thereby giving rise to the problem that the received signal quality is deteriorated. During handover a sufficiently long guard time is needed to prevent such inter-symbol interference.

The portable terminal 10 according to this embodiment is designed to perform communications by use of an OFDM symbol including a guard time long enough to prevent the inter-symbol interference. During the normal state since the length of the guard time is returned to its original length, that is, since the portable terminal 10 uses an OFDM symbol including a guard time shorter than that used during handover, it is possible to minimize a decrease in the throughput.

Figure 6:
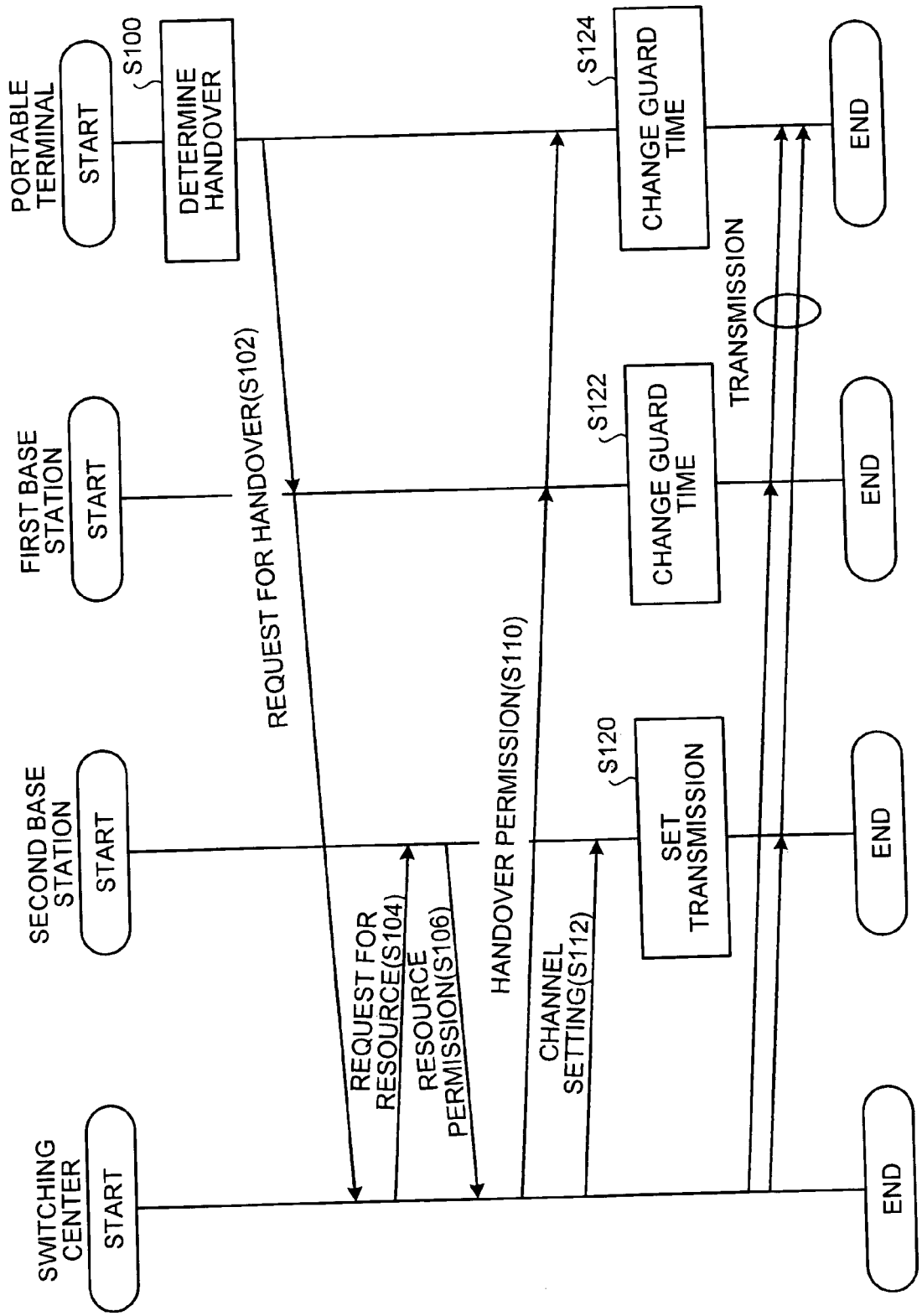
FIG. 6 is a flowchart of the procedure of the communication system for handover.

FIG. 6 is a flowchart of the procedure of the communication system 1 for handover. With reference to FIG. 6, a description will be given of the procedure by which the portable terminal 10 switches the communication partner from the first base station 30 to the second station 40.

The portable terminal 10 regularly monitors or observes the propagation environment (step S100). When the intensity of radio waves from the second base station 40 exceeds a reference value, the portable terminal 10 sends to the first base station 30 and the switching center 50 a request for handover indicating that the portable terminal 10 can enter the handover state (step S102). The reference value mentioned above is a preset value.

Upon receiving the request, the first base station 30 inquires of the switching center 50 if a radio resource at the handover destination is usable. The handover destination in this case is the second base station 40.

Upon receiving the request for handover and the inquiry about the radio resource, the switching center 50 inquires of the second base station 40 if its radio resource is usable (step S104). If the second base station 40 has an idle radio resource, the switching center 50 receives from the second base station 40 a resource permission indicating the radio resource is available (step S106). The switching center 50 then sends to the first base station 30 and the portable terminal 10 a handover permission that authorizes the portable terminal 10 to enter the handover (step S110). Thereafter, the switching center 50 performs setting to establish a line from the second base station 40 (step S112).

By the above processing, the switching center 50 sets the guard time of the OFDM symbol that is used during handover. Similarly, the second base station 40 sets the guard time of the OFDM symbol that is used during handover (step S120).

Upon receiving the handover permission, the first base station 30 and the portable terminal 10 changes the length of the guard time (steps S122, S124). In this embodiment, the guard time is set longer than that during the normal state, and the symbol length is made twice longer than that during the normal sate. In the way described above, the switching center 50, the first and the second base stations 30 and 40 and the portable terminal 10 set OFDM symbols including the guard times of the same length at the same timing.

Figure 7:
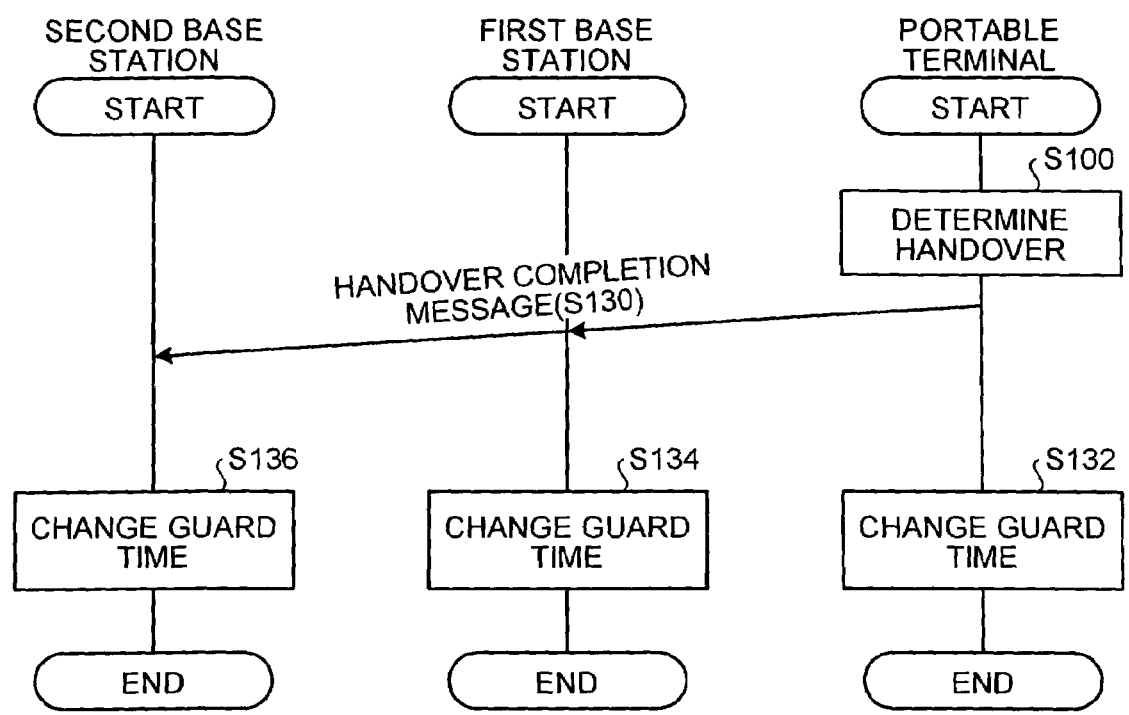
FIG. 7 is a flowchart of the procedure of the communication system for terminating the handover.

FIG. 7 is a flowchart of the procedure of the communication system 1 for terminating the handover. Upon determining the completion of handover (step S100), the handover decision unit 122 of the portable terminal 10 sends a handover completion message to the first and the second base stations 30 and 40 (step S130). The controller 120 restores or resets the guard time to its original length (step S132). The original length herein mentioned is the length of the guard time that is used during the normal state.

Upon receiving the handoff completion message from the portable terminal 10, the first and the second base stations 30 and 40 each reduces the length of the guard time and changes the symbol length to ½ that during handover; that is, each base station restores the length of the guard time to the normal length. Thus the second base station 40, the first base station 30, and the portable terminal 10 set OFDM symbols including guard times of the same length at the same timing.

The reduction of the guard time length after the completion of handover as described above permits reduction of the system overhead, providing for increased communication efficiency.

The communication system 1 according to a second embodiment of the present invention will be described next. In the communication system 1 according to the second embodiment, the length of the guard time is determined based on the difference in the timing for receiving radio waves from the first and the second base stations 30 and 40 during handover.

Figure 8:
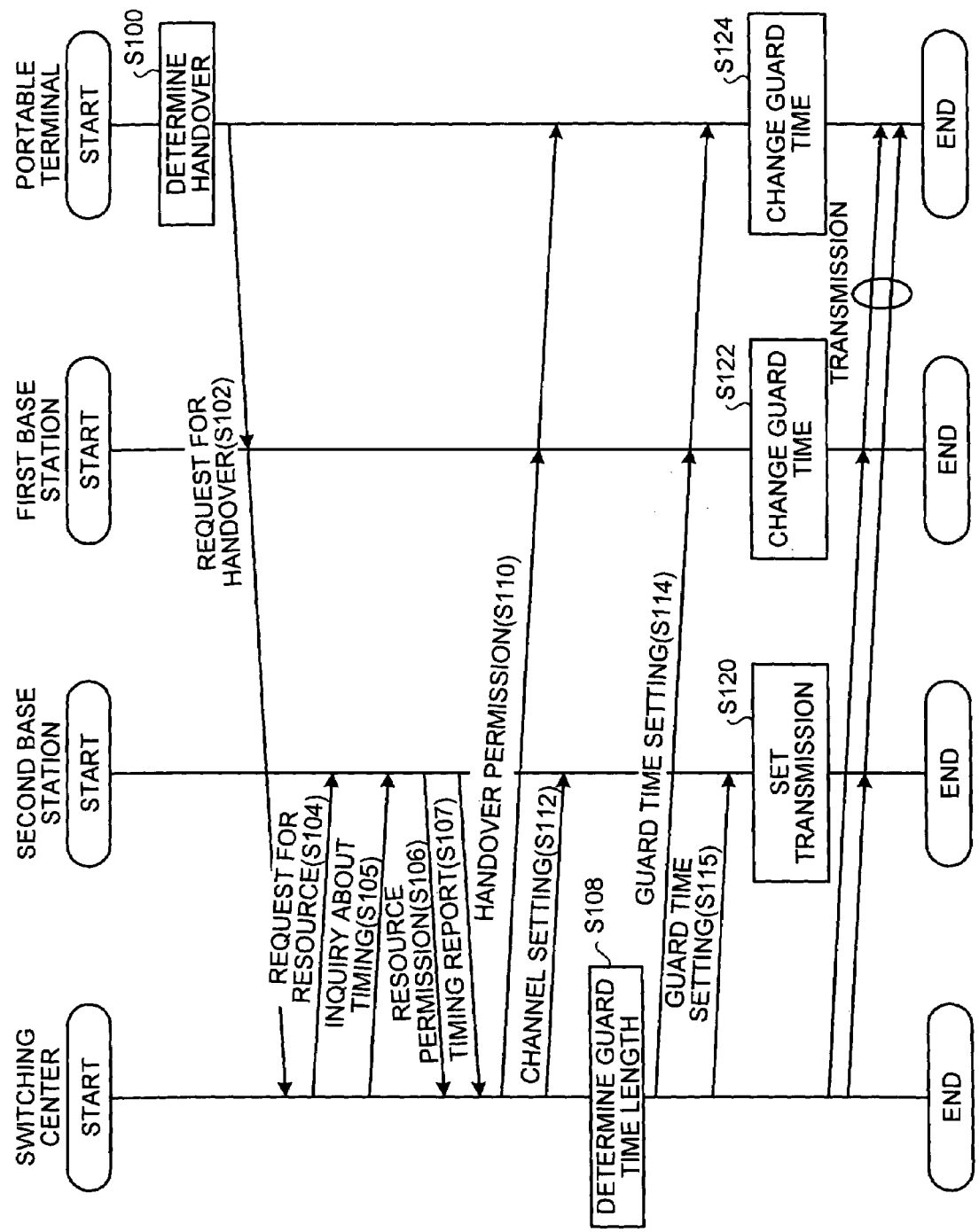
FIG. 8 is a flowchart of the procedure by which a communication system according to a second embodiment enters handover.

FIG. 8 is a flowchart of the procedure by which the communication system 1 according to the second embodiment enters handover. In this embodiment, the switching center 50 sends a request for resource to the second base station 40 (step S104), and inquires of the second base station 40 about the timing of radio waves (step S105), and receives as an answer to the inquiry a report on the timing of radio waves (step S107).

Based on the timing report it received, the switching center 50 determines the length of the guard time (step S108). The length of the guard time thus determined is longer than the length of the guard time set for the normal state. The length of the guard time may preferably be set such that the symbol length is twice longer than that set for the normal state.

The switching center 50 posts the thus determined length of the guard time to the second base station 40, the first base stations 30, and the portable terminal 10 (steps S114, S115). The second base station 40, the first base station 30, and the portable terminal 10 set guard times of the same length at the same timing.

Figure 9:
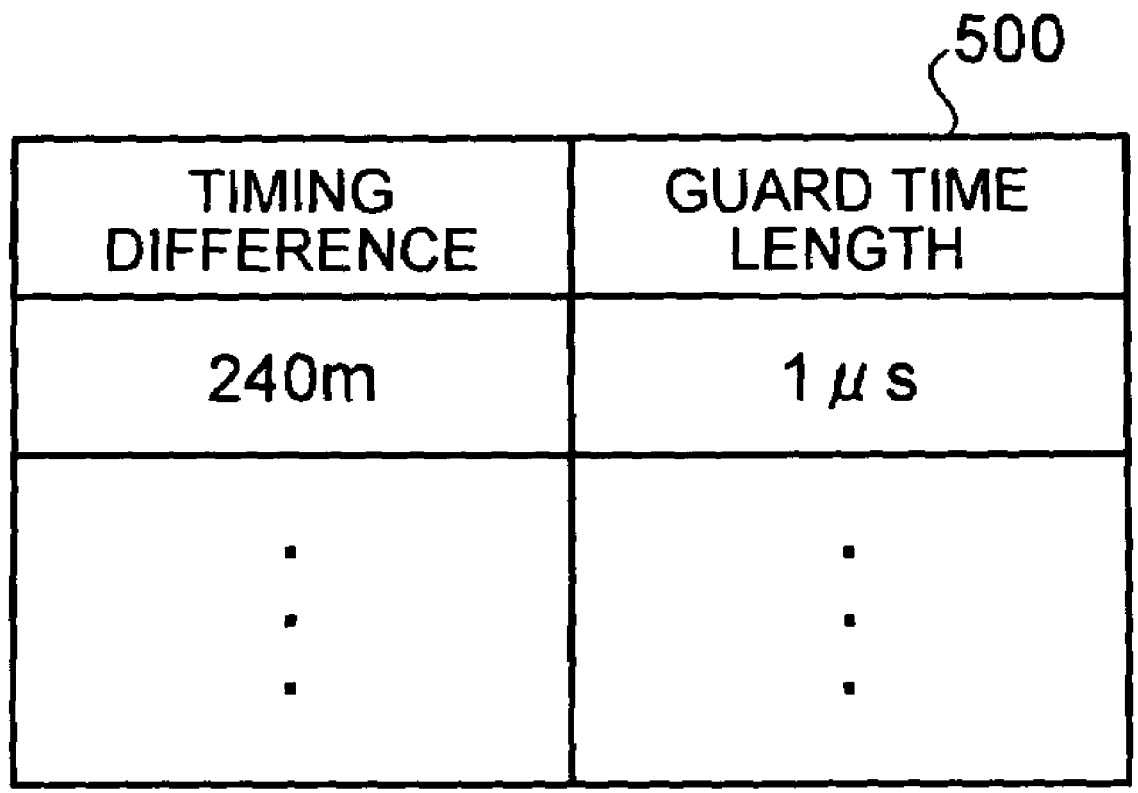
FIG. 9 is a guard time length table which a switching center uses to determine the length of the guard time.

FIG. 9 is a guard time length table 500 which the switching center 50 uses to determine the length of the guard time. The guard time length table 500 associates the timing differences between the two base stations with the guard time lengths. Upon specifying the timing difference between the two base stations, the switching center 50 selects the guard time length corresponding to the specified timing difference in the table 500.

Since the timing difference and the guard time length are associated with each other in the guard time length table 500 as mentioned above, the switching center 50 is capable of setting the length of the guard time based on the timing difference.

A description will be given of the procedure for determining the length of the guard time. Examples of numerical values for the guard time will be given below, for example, on the basis of Institute of Electrical and Electronics Engineers (IEEE) 802.11a. The length of the guard time needs to be determined based on a propagation delay time anticipated in the system; in the case of soft handover, it is determined using, as a guide, the difference in distance between the portable terminal and the respective base stations plus the accuracy of time of each base station.

For example, when the cell radius is several tens of meters and the OFDM symbol length is 4 microseconds, it is preferable that the guard time is 0.8 microsecond. The 0.8 microsecond long guard time corresponds to a propagation delay difference of 240 meters.

When the data rate in the communication system 1 is assumed to be the same as IEEE 802.11a and the cell radius is of the order of several hundred meters, a guard time of about one OFDM symbol is required to accommodate the difference in the distance between the terminal and the respective base stations. When the cell radius is of the order of several kilometers, a guard time corresponding to several symbols is needed. In the case of reducing the OFDM symbol length to increase the transmission rate, the guard time should be increased accordingly.

The communication system 1 according to this embodiment is identical in configuration and operation with the communication system 1 described in the first embodiment except the above.

A communication system 1 according to a third embodiment will be described next. In the communication system 1 according to the third embodiment, the portable terminal 10 measures the timing difference between the two base stations concerned with handover. Based on the timing difference, the switching center 50 determines the length of the guard time for handover. The communication system in the third embodiment differs from that of the first embodiment in this respect.

Figure 10:
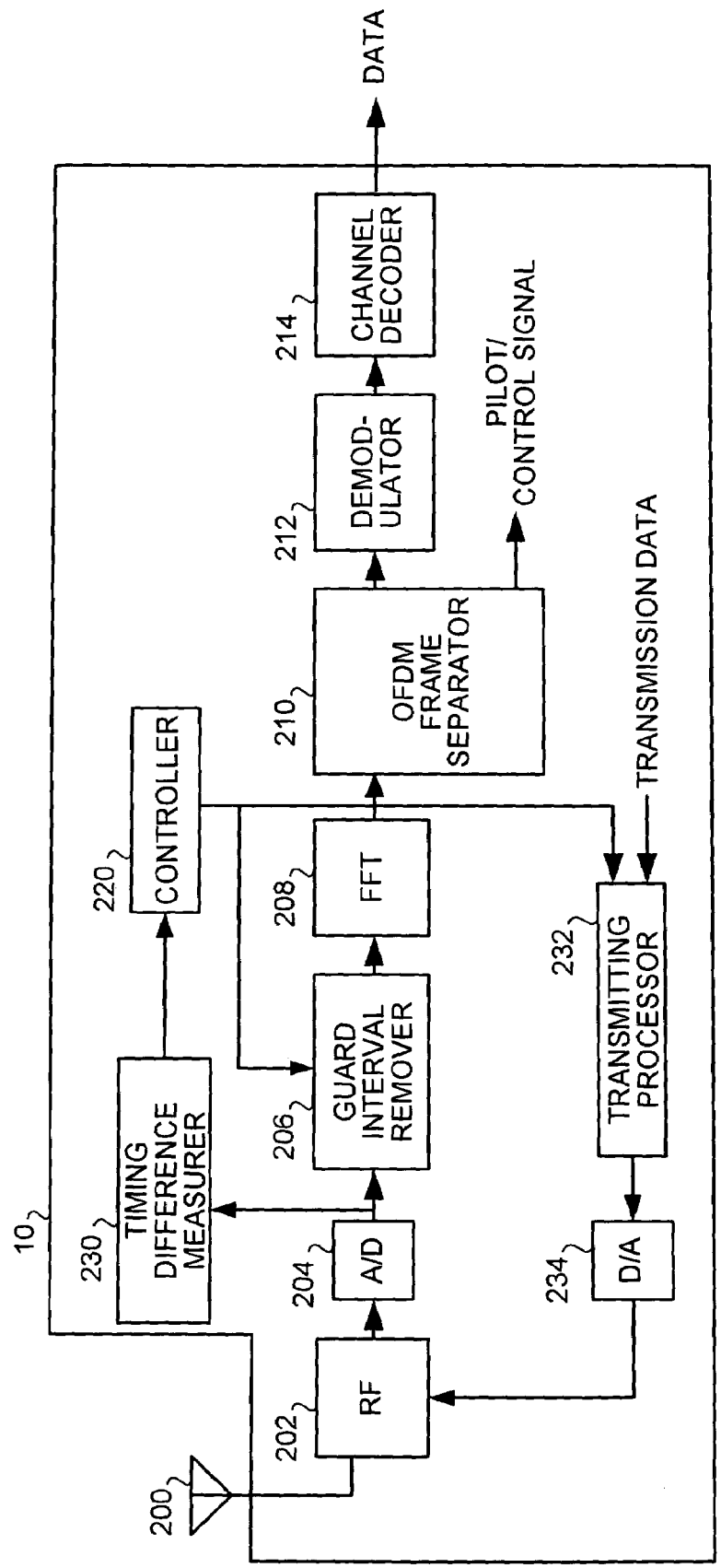
FIG. 10 depicts the functional configuration of a portable terminal according to a third embodiment.

FIG. 10 depicts the functional configuration of the portable terminal 10 according to this embodiment.

In this embodiment, reference data is sent from the portable terminal 10 via a transmitting processor 232 and a D/A converter 234 to the first and the second base stations 30 and 40. Upon receiving the reference data, the first and the second base stations 30 and 40 send the reference data back to the portable terminal 10. A timing difference measurer 230 of the portable terminal 10 the timing difference between the two pieces of reference data received as answers to the reference data from the first and the second base stations 30 and 40.

A controller 220 sends to the transmitting processor 232 a timing difference report indicating the timing difference measured by the timing difference measurer 230. The timing difference report is sent to the switching center 50 via the transmitting processor 232, the D/A converter 234, an RF unit 202, and an antenna 200. The transmitting processor 232 has the functions of the channel encoder 100, the modulator 102, the OFDM frame generator 104, the IFFT unit 106, and the guard interval adder 108 previously described with reference to FIG. 2.

The controller 220 controls a guard interval remover 206 as is the case with the controller 220 in the first embodiment.

The switching center 50 in this embodiment also has the same guard time length table 500 as that in the second embodiment. The switching center 50 determines the length of the guard time based on the timing difference indicated in the timing difference report received from the portable terminal 10.

Figure 11:
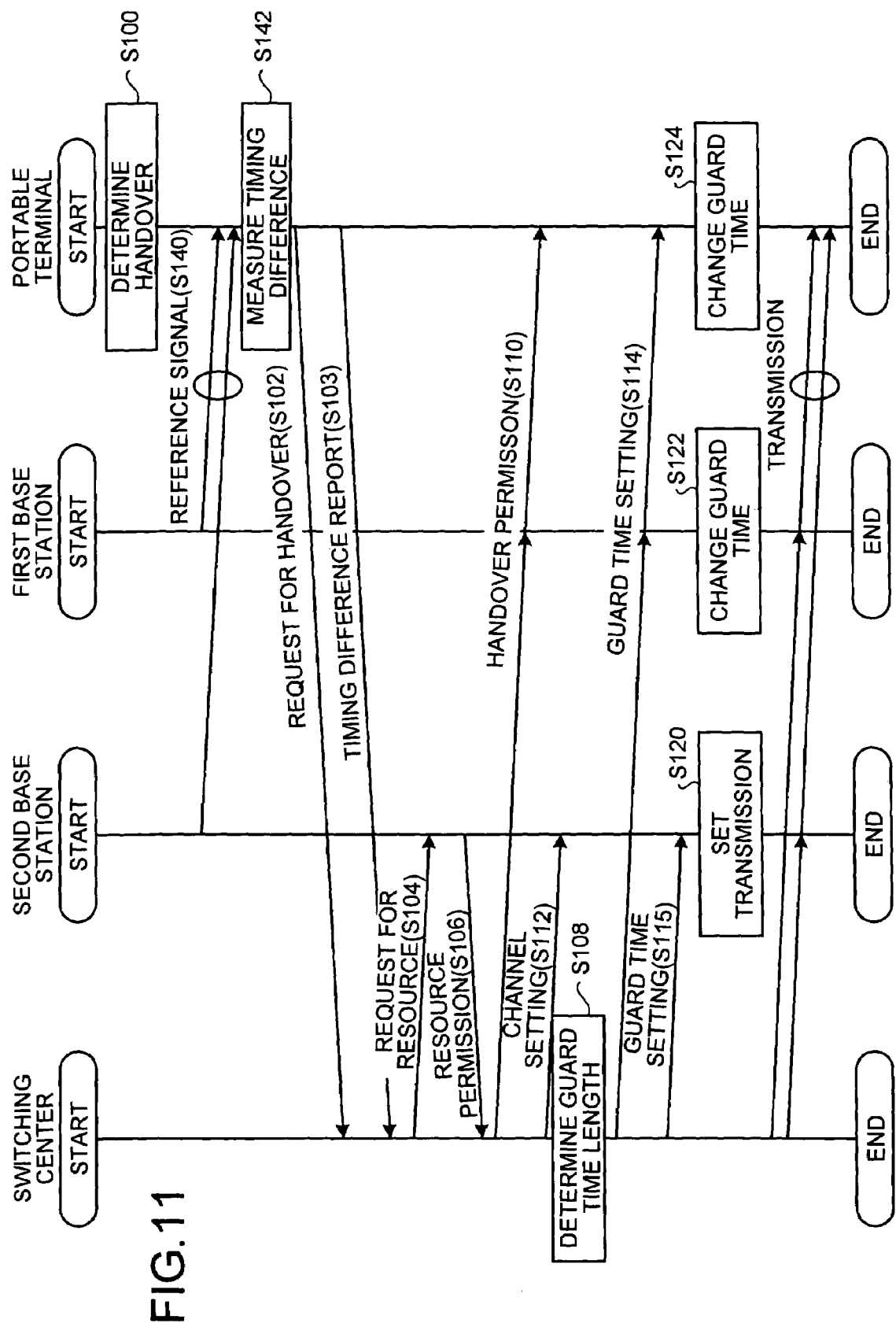
FIG. 11 is a flowchart of the procedure by which the portable terminal according to the third embodiment enters handover.

FIG. 11 is a flowchart of the procedure by which the portable terminal 10 in this embodiment enter handover. In this embodiment, the portable terminal 10 receives reference signals from the first and the second base stations 30 and 40 at fixed time intervals (step S140). The timing difference measurer 230 measures the timing difference based on the timing at which the reference signals receives from the first and the second base stations 30 and 40 (step S142). The portable terminal 10 sends a request for handover (step S102), and sends to the switching center 50 a timing difference report indicating the measured timing difference (step S103).

The switching center 50 determines the guard time based on the timing difference report (step S108), and posts the determined guard time to the second base station 40, the first base station 30, and the portable terminal 10 (steps S114, S115).

While in this embodiment the timing difference measurer 230 of the receiver 12 has been described as measuring the timing difference based on the signal fed from the A/D converter 204, it may also use a signal fed from the guard interval remover 206 to measure the timing difference.

The communication system 1 according to this embodiment is identical in configuration and procedure with the communication system 1 described in the first embodiment except the above.

A communication system 1 according to a fourth embodiment of the present invention will be described next. In the communication system 1, too, the timing difference measurer 230 of the portable terminal 10 measures the time difference between the first and the second base stations 30 and 40, and the controller 220 determines the length of the guard time based on the time difference.

The controller 220 has the guard time length table 500 described previously with respect to the second embodiment, and determines the length of the guard time through use of the table 500. The communication system 1 according to the fourth embodiment differs in this respect from the communication system of the other embodiments. The controller 220 in this embodiment constitutes the length determiner described in the appended claims.

Figure 12:
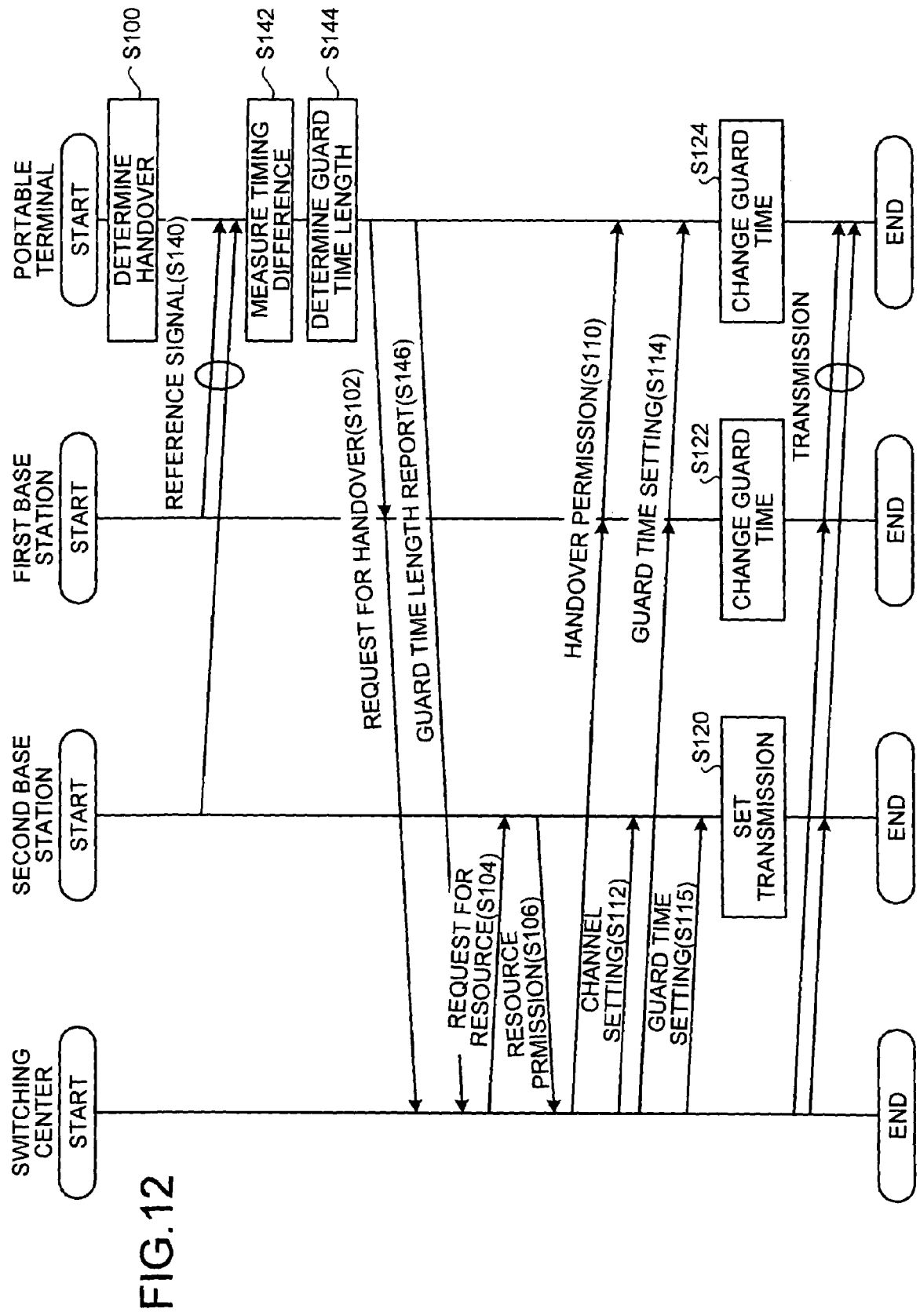
FIG. 12 is a flowchart of the procedure by which a communication system according to a fourth embodiment enters handover.

FIG. 12 is a flowchart of the procedure by which the communication system 1 according to the fourth embodiment enters handover. Upon the portable terminal 10 receiving reference signals from the first and the second base stations 30 and 40 (step S140), the timing difference measurer 230 measures the timing difference between the two reference signals (step S142).

The controller 220 determines, as the guard time length for handover, that one of the guard time lengths in the table 500 which corresponds to the timing difference measured by the timing difference measurer 230 (step S144). The controller 220 then sends or reports the thus determined guard time length to the switching center 50 (step S146).

The switching center 50 posts the reported guard time length to the first base station 30, the second base station 40, and the portable terminal 10 (steps S114, S115). In this embodiment, since the portable terminal 10 already recognizes the guard time length, the switching center 50 needs not always to post the guard time length to the portable terminal 10. The above processing enables the first base station 30, the second base station 40, and the portable terminal 10 to set the same guard time length during handover.

The communication system 1 according to this embodiment is identical in configuration and operation with the communication system 1 described in the third embodiment except the above.

A communication system 1 according to a fifth embodiment will be described next. In the communication system 1 according to this embodiment, the portable terminal 10 performs OFDM modulation and direct spectrum spreading of a transmission signal. The guard time length and the spreading rate are changed, depending on whether the communication system 1 is in handover mode. More specifically, the spreading rate during handover and the spreading rate during the normal state are preset, and are selected depending on whether the communication system 1 is in handover mode.

The communication system according to this embodiment differs in this respect from the communication systems of the other embodiments.

Figure 13:
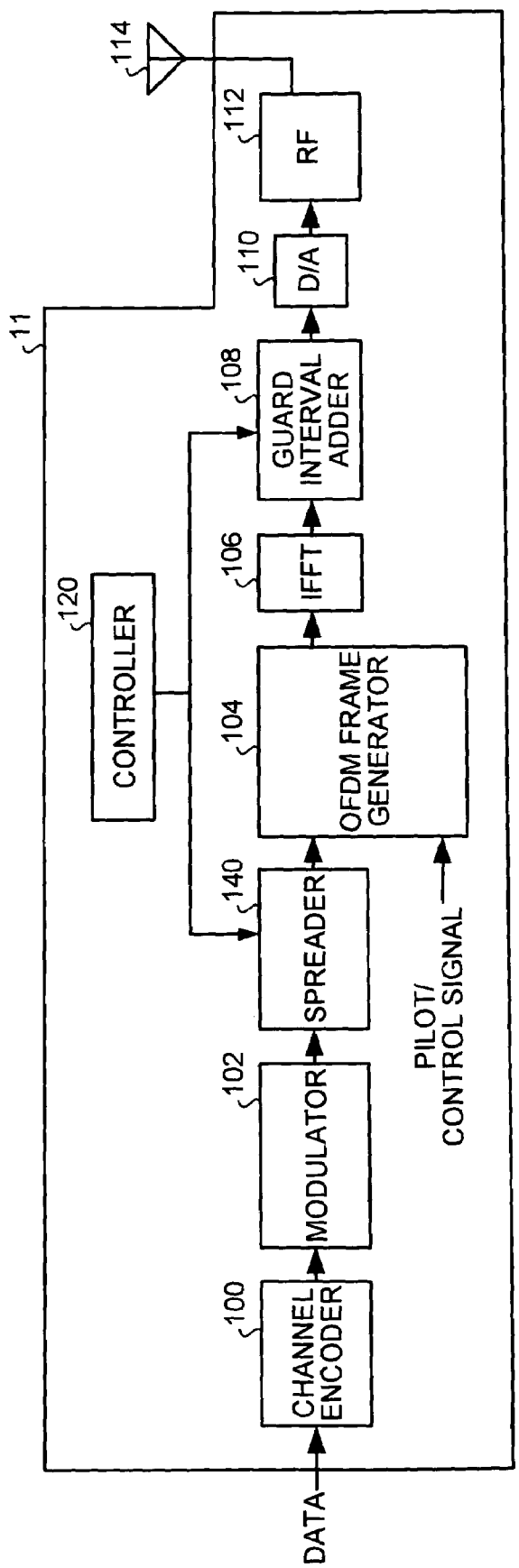
FIG. 13 depicts the functional configuration of a transmitting processor of a portable terminal according to a fifth embodiment.

FIG. 13 depicts the functional configuration of the transmitter 11 of the portable terminal 10 in this embodiment. The depicted transmitter 11 has a spreader 140 for direct spectrum spreading, in addition to the functional configuration of the transmitter 11 in the first embodiment. The controller 120 in this embodiment controls the guard interval adder 108 as in the first embodiment. Further, the controller 120 controls the spreader 140. More specifically, the controller 120 changes the spreading rate for the spectrum spreading by the spreader 140, depending on whether the communication system 1 is in handover mode.

Figure 14:
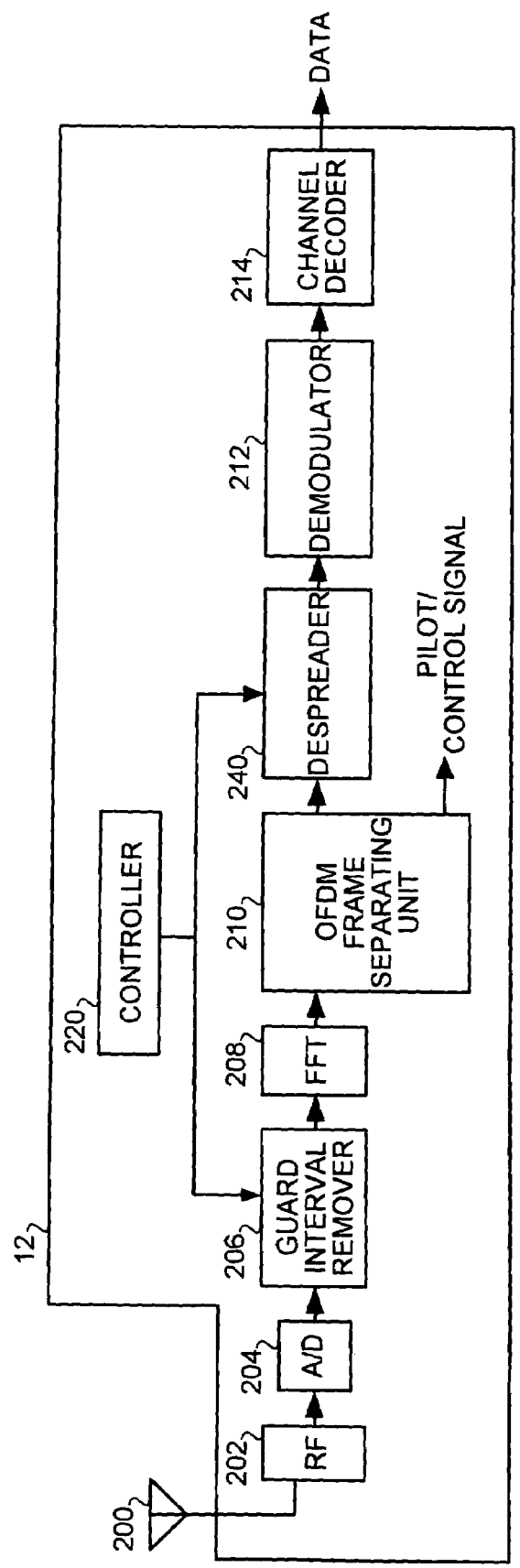
FIG. 14 depicts the functional configuration of a receiving processor of the portable terminal according to the fifth embodiment.

FIG. 14 depicts the functional configuration of the receiver 12 of the portable terminal 10 in the fifth embodiment. The depicted receiver 12 has a despreader 240 for spectrum despreading, in addition to the functional configuration of the receiver 12 in the first embodiment. The controller 120 in this embodiment controls the guard interval remover 206 as in the first embodiment. Further, the controller 120 controls the despreader 240. More specifically, the controller 120 changes the spreading rate for the spectrum despreading by the despreader 240, depending on whether the communication system 1 is in handover mode.

Figure 15A:
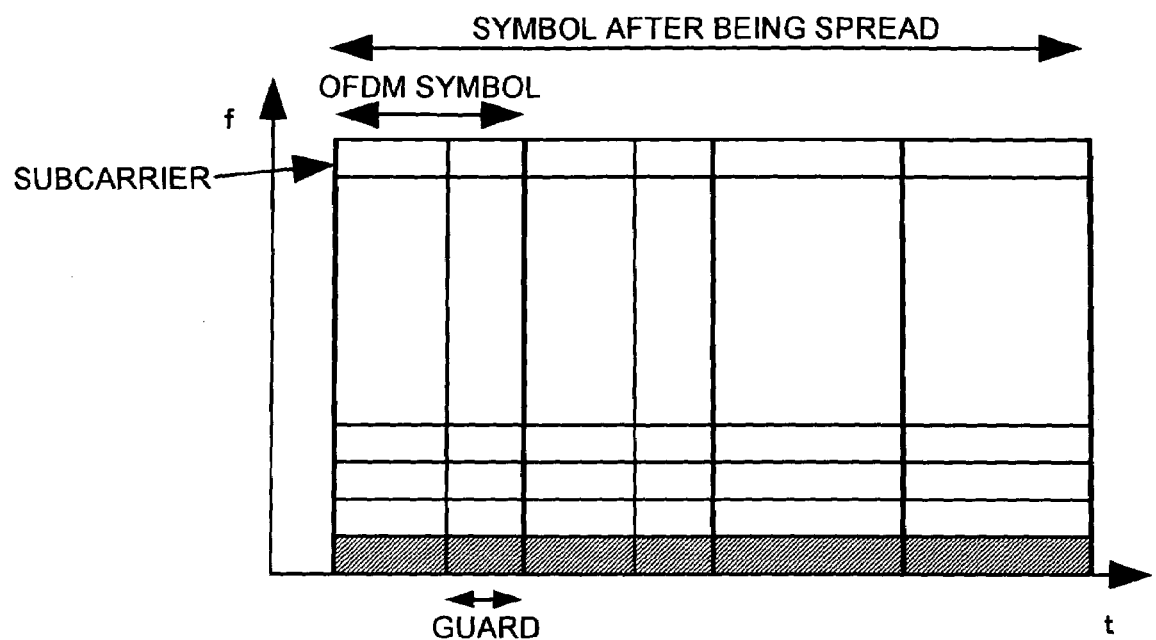
FIGS. 15A and 15B depict the OFDM symbol sent and received between the portable terminal and a base station, in a communication system according to the fifth embodiment.
Figure 15B:
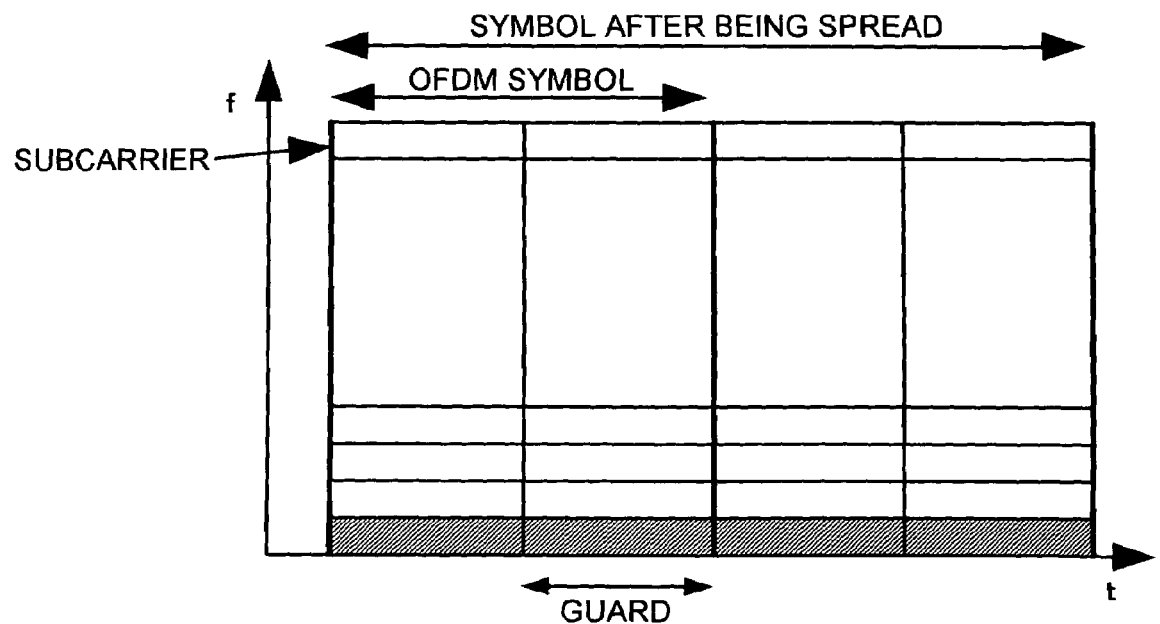

FIGS. 15A and 15B schematically depict OFDM symbols that are transmitted and received between the portable terminal 10 and the base stations 30 and 40 in the communication system of this embodiment.

FIG. 15A depicts the OFDM symbol for use during the normal state. FIG. 15B depicts the OFDM symbol for use during handover.

During the normal state the OFDM symbol is spread at a spreading rate 4. The guard time in the OFDM symbol is set at a length longer than an anticipated multipath propagation delay. In the OFDM symbol during handover the guard time is set longer than that during the normal state. This provides for increased robustness against the difference in the timing of reception from the first and the second base stations 30 and 40.

The spreading rate is set low corresponding to an increase in the guard time length. The OFDM symbol shown in FIG. 15B is spread at a spreading rate 2. Such a low spreading rate like this makes it possible to secure the throughput and continue communication without lowering the data rate.

FIG. 16 is a flowchart of the procedure by which the communication system 1 according to the fifth embodiment shifts to handover. In the communication system 1 according to this embodiment, a handover permit is sent from the switching center 50 (step S110), and when a line or channel to the second base station 40 is set up (step S112), the spreading rate "2" during handover is set at a transmission setting stage (step S120) in the second base station 40. In the case of setting such a low spreading rate, it may preferably be changed to a value 1/n of the original value, where n is an integer.

The first base station 30 and the portable terminal 10 change the guard time length (steps S122, S124) and the spreading rate (steps S123, S125). In the communication system 1 according to this embodiment, the respective devices simultaneously change the guard time lengths and spreading rates to the same values as described above.

Figure 17:
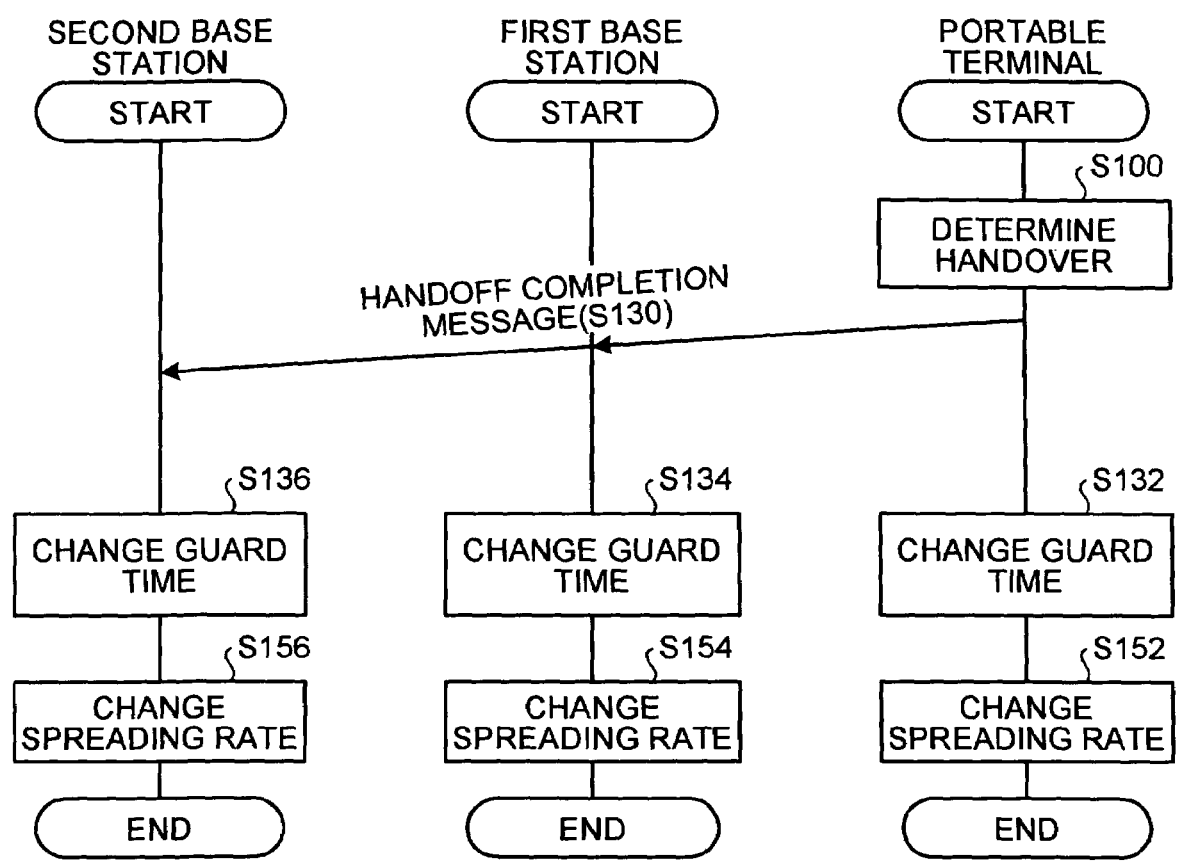
FIG. 17 is a flowchart of the procedure by which the communication system according to the fifth embodiment switches handover to a normal state.

FIG. 17 is a flowchart of the procedure by which the communication system 1 according to the fifth embodiment switches handover to the normal state. In this instance, upon determining the completion of handover (step S100), the portable terminal 10 resets or turn back the guard time length to the original value (step S132) and the spreading rate to the original value (step S152). The original spreading rate mentioned herein is one that ought to be set during the normal state. In this embodiment it is set at "4."

Upon receiving a handoff end notice from the portable terminal 10, the first and the second base stations 30 and 40 reset the guard time length to the normal value (steps S134, S136) and the spreading rate to the normal value (steps S154, S156). Thus, the base station 40, the first base station 30, and the portable terminal 10 set OFDM symbols including the same guard time and spread at the same spreading rate.

As described above, at the completion of handoff, by reducing the guard time and increasing the spreading rate, it is possible to reduce the system overhead and hence enhance the communication efficiency.

The communication system 1 according to this embodiment is identical in configuration and operation with the communication system 1 described in the first embodiment except the above.

A communication system 1 according to a sixth embodiment will be described next. In the sixth embodiment, a decrease in the throughput, which is caused by switching of the guard time during handover, is compensated for by changing other parameters. This embodiment differs in this respect from other embodiments.

Figure 18:
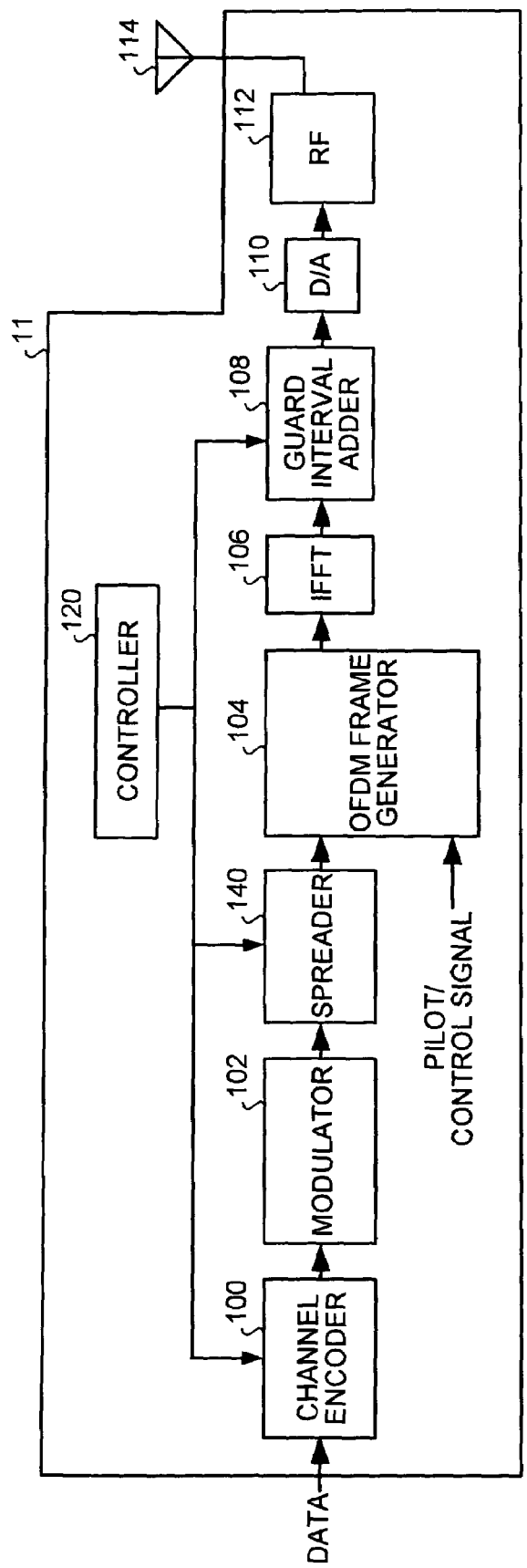
FIG. 18 depicts the functional configuration of a transmitting processor of a portable terminal according to a sixth embodiment.

FIG. 18 depicts the functional configuration of the transmitter 11 of the portable terminal 10 according to this embodiment. The transmitter 11 in this embodiment has the same functional configuration as that in the fifth embodiment. In the transmitter 11 the controller 120 controls the channel encoder 100. The controller 120 further controls the spreader 140 and the guard interval adder 108 as is the case with the controller 120 in the fifth embodiment.

Figure 19:
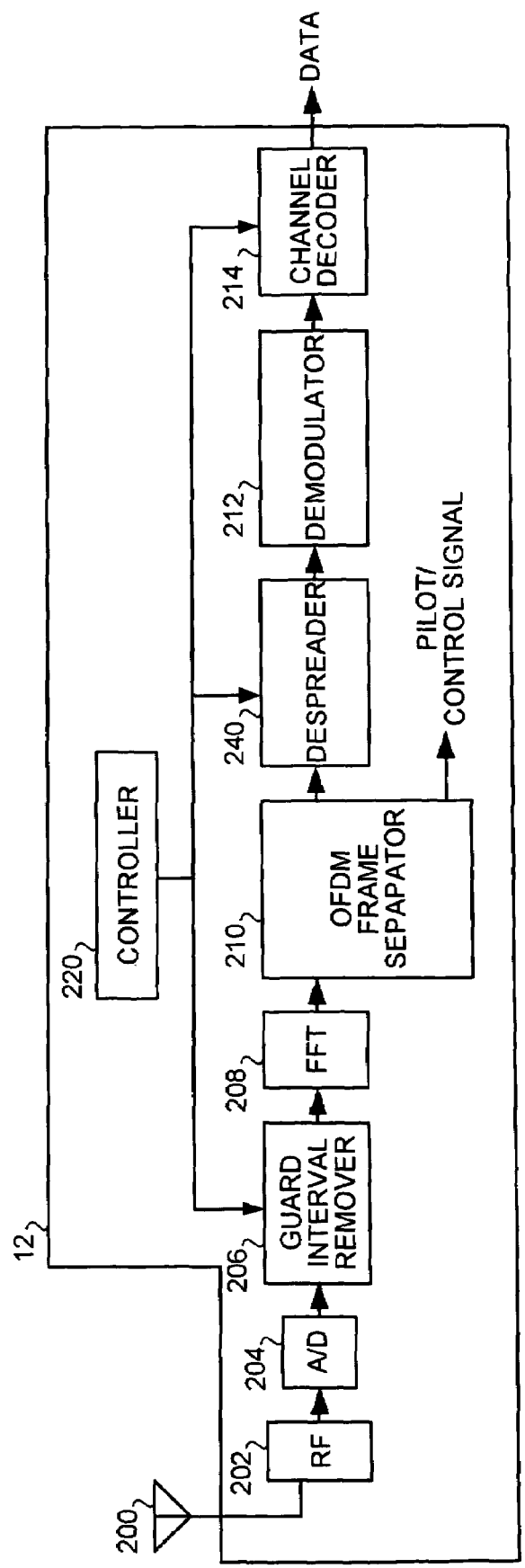
FIG. 19 depicts the functional configuration of a receiving processor of the portable terminal according to the sixth embodiment.

FIG. 19 depicts the functional configuration of the receiver 12 of the portable terminal 10 according to the sixth embodiment. The receiver 12 is common in functional configuration to the receiver 12 in the fifth embodiment. In the receiver 12, the controller 220 controls the channel decoder 214. The controller 220 further controls the guard interval remover 206 and the despreader 240 as is the case with the controller 220 in the fifth embodiment.

The channel encoder 100 and the channel decoder 214 respond to instructions from the controllers 120 and 220, respectively, to use an error correcting encoding rate and parameters in puncturing and repetition to compensate for a decrease in the throughput that results from changing the guard time.

These parameters affect the quality of the radio channel as well. Accordingly, the values of these parameters to be changed need to be determined by a tradeoff between the throughput and the channel quality. The use of such a scheme provides for increased robustness against the timing difference between the first and the second base stations 30 and 40. By changing the encoding rate and the puncturing/repetition parameter in accordance with an increase in the guard time length, it is possible to secure the throughput and keep on communications without reducing the data rate.

The communication system 1 according to this embodiment is identical in configuration and operation with the communication system 1 described in the fifth embodiment except the above.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. A portable terminal communicating with a plurality of base stations by use of an orthogonal frequency division multiplexing (OFDM) signal, the portable terminal comprising:
   a communication unit which sends and receives the OFDM signal to and from the base stations;
   a switching timing detector which detects switching a timing at which a handover and a normal state are switched therebetween; and
   an OFDM signal controller which changes a guard time length of the OFDM signal upon detecting the timing by the switching timing detector,
   wherein
   the OFDM signal controller changes a symbol length to a value two times as great as a currently set symbol length when the switching timing detector detects the handover start timing at which the normal state is switched to the handover.

2. A portable terminal communicating with a plurality of base stations by use of an orthogonal frequency division multiplexing (OFDM) signal, the portable terminal comprising:
   a communication unit which sends and receives the OFDM signal to and from the base stations;
   a switching timing detector which detects a switching timing at which a handover and a normal state are switched therebetween;
   an OFDM signal controller which changes a guard time length of the OFDM signal upon detecting the timing by the switching timing detector;
   a timing difference measurer which measures a timing difference between two OFDM signals received by the communication unit from two base stations during the handover, respectively; and
   a length determiner, which determines a value of the guard time length to be changed by the OFDM signal controller based on the timing difference measured by the timing difference measurer,
   wherein
   the OFDM signal controller changes the guard time length to the value determined by the length determiner when the switching timing detector detects the handover start timing at which the normal state is switched to the handover.

3. The portable terminal according to claim 2, further comprising a guard time length table in which the timing difference and the value of the guard time length to be set for the OFDM signal are associated with each other,
   wherein
   the length determiner determines the value of the guard time length associated with the timing difference measured by the timing difference measurer in the guard time length table as a value of the guard time length to be changed by the OFDM signal controller.

4. A portable terminal communicating with a plurality of base stations by use of an orthogonal frequency division multiplexing (OFDM) signal, the portable terminal comprising:
   a communication unit which sends and receives the OFDM signal to and from the base stations;
   a switching timing detector which detects a switching timing at which a handover and a normal state are switched therebetween;
   an OFDM signal controller which changes a guard time length of the OFDM signal upon detecting the timing by the switching timing detector; and
   a spreading rate determiner which changes a spreading rate to a value 1/n of currently set spreading rate,
   wherein
   n is an integer that is two when the switching timing detector detects the handover start timing at which the normal state is switched to the handover.

5. A communication system in which a plurality of base stations and a portable terminal communicate with each other by use of an OFDM signal, wherein the portable terminal comprises:
   a communication unit which sends and receives the OFDM signal to and from the base stations;
   a switching timing detector which detects switching a timing at which a handover and a normal state are switched therebetween; and
   an OFDM signal controller which changes a guard time length of the OFDM signal upon detecting the timing by the switching timing detector,
   wherein
   the OFDM signal controller changes a symbol length of the OFDM signal to a value 2 times as great as a currently set symbol length when the switching timing detector detects the handover start timing at which the normal state is switched to the handover, and the base stations each change the guard time length to the same length as that changed by the OFDM signal controller at the same time as the OFDM signal controller changes the guard time length.

6. A method of communicating with a base station by a portable terminal, the method comprising:
   sending and receiving an OFDM signal to and from the base station;
   detecting a switching timing at which a handover and a normal state are switched therebetween;
   changing a guard time length of the OFDM signal when the switching timing is detected; and
   changing a symbol length of the OFDM signal to a value twice as great as a currently set symbol length when the switching time detector detects the handover start timing at which the normal state is switched to the handover,
   wherein
   a guard time length table is provided in which a timing difference and a value of the guard time length to be set for the OFDM signal are associated with each other and
   the length determiner determines the value of the guard time length associated with the timing difference measured by a timing difference measurer in the guard time length table as the value of the guard time length to be changed by the OFDM signal controller.

7. A communication system in which a plurality of base stations and a portable terminal communicate with each other by use of an OFDM signal, wherein the portable terminal comprises:
   a communication unit which sends and receives the OFDM signal to and from the base stations;
   a switching timing detector which detects a switching timing at which a handover and a normal state are switched therebetween;
   an OFDM signal controller which changes a guard time length of the OFDM signal upon detecting the switching timing by the switching timing detector;

a timing difference measurer which measures a timing difference between two OFDM signals received by the communication unit from two base stations during the handover, respectively; and a length determiner which determines a value of the guard time length to be changed by the OFDM signal controller based on the timing difference measured by the timing difference measurer, wherein the OFDM signal controller changes the guard time length to the value determined by the length determiner when the switching timing detector detects the handover start timing at which the normal state is switched to the handover.

8. The communication system according to claim 7, and further comprising a guard time length table in which the timing difference and the value of the guard time length to be set for the OFDM signal are associated with each other, wherein the length determiner determines the value of the guard time length associated with the timing difference measured by the timing difference measurer in the guard time length table as the value of the guard time length to be changed by the OFDM signal controller.

9. A communication system in which a plurality of base stations and a portable terminal communicate with each other by use of an OFDM signal wherein the portable terminal comprises:

a communication unit which sends and receives the OFDM signal to and from the base stations;

a switching timing detector which detects a switching timing at which a handover and a normal state are switched therebetween;

an OFDM signal controller which changes a guard time length of the OFDM signal upon detecting the timing by the switching timing detector; and a spreading rate determiner which changes a spreading rate of the OFDM signal based on a value of the guard time length changed by the OFDM signal controller, wherein the spreading rate determiner which changes the spreading rate to a value ½ of a currently set spreading rate when the switching timing detector detects the handover start timing at which the normal state is switched to the handover, and the base stations each change the guard length to the same length as that changed by the OFDM signal controller at the same time as the OFDM signal controller changes the guard time length.

* * * * *